July 2, 1935. H. NIEDERREITHER 2,007,096
PRESSURE ELECTROLYZER FOR THE PRODUCTION OF HYDROGEN AND OXYGEN
Filed March 23, 1933 6 Sheets-Sheet 1

July 2, 1935. H. NIEDERREITHER 2,007,096

PRESSURE ELECTROLYZER FOR THE PRODUCTION OF HYDROGEN AND OXYGEN

Filed March 23, 1933   6 Sheets-Sheet 3

July 2, 1935.  H. NIEDERREITHER  2,007,096
PRESSURE ELECTROLYZER FOR THE PRODUCTION OF HYDROGEN AND OXYGEN
Filed March 23, 1933  6 Sheets-Sheet 4

July 2, 1935.                H. NIEDERREITHER                2,007,096
PRESSURE ELECTROLYZER FOR THE PRODUCTION OF HYDROGEN AND OXYGEN
            Filed March 23, 1933        6 Sheets-Sheet 5

July 2, 1935.　　　　　H. NIEDERREITHER　　　　2,007,096
PRESSURE ELECTROLYZER FOR THE PRODUCTION OF HYDROGEN AND OXYGEN
Filed March 23, 1933　　　6 Sheets-Sheet 6

Patented July 2, 1935

2,007,096

UNITED STATES PATENT OFFICE 2,007,096

PRESSURE ELECTROLYZER FOR THE PRODUCTION OF HYDROGEN AND OXYGEN

Hans Niederreither, Munich, Germany, assignor to the firm Druckzersetzer G. m. b. H., Berlin, Germany Application March 23, 1933, Serial No. 662,348
In Germany March 23, 1932

23 Claims. (Cl. 204—5)

There are frequently used for electrolysis, particularly for the electrolysis of water, horizontally disposed decomposing devices with cells arranged at right angles to the longitudinal axis of the decomposing device and bipolar electrodes. There are also used to a great extent closed floating separate cells of which a number are arranged in series. Electrolyzers are also known having a number of electrodes arranged in parallel which together form a cell. It has also been proposed to use electrolyzers of a vertical construction with groups of electrodes arranged in parallel, the separate groups being arranged in series. Further it has also been proposed to use inclined decomposing devices having tubular cells arranged parallel to the longitudinal axis, that is to say, also inclined, with the separate cells in parallel.

These constructions and circuit arrangements have also been proposed to a large extent in connection with electrolyzers operating at high pressures.

All these constructions and circuit arrangements for low pressure and high pressure decomposing devices have however various defects which act unfavourably during operation on the life, purity of the gas, efficiency and so forth.

The bi-polar filter press systems which are most frequently used, in addition to the disadvantage of a fairly high shunt current, also have the further disadvantage of a shorter overall length, determined by the voltage, which is particularly deleterious for pressure decomposing devices as in such cases it is more economical to produce vessels of great length than shorter ones. The asbestos fabrics or finely perforated nickelled sheets, used as diaphragms in filter press electrolyzers have the disadvantage of a low mechanical strength and must therefore be repeatedly changed. The gases only rise on one side in the electrode chamber so that a deleterious back-flow with pressure fluctuations is liable to occur in the cell, whilst the quantity of electrolyte passing from the cell and flowing through the entire system is too small for carrying away the entire heat. It is not possible to increase the circulating quantity of electrolyte by pumps or any other means as these would be liable to cause a still further straining of the diaphragms.

With decomposing systems arranged in parallel or otherwise as above described it is possible to throttle the shunt current and it is also possible to conduct away the heat for example, in the case of decomposing devices consisting of separate cells.

Further up to the present time, no construction of this or of a similar character is known, in which the electrolyte from both sides is mixed uniformly with gas and on the other sides is guided by frame surfaces and the diaphragms are so protected that a strong uniform circulation can be obtained by means of pumps or similar auxiliary means.

The subject of the present invention is a decomposing device, particularly a pressure decomposing device in which there is used the known parallel arrangement of any suitable number of electrodes forming a group and arranging in series any suitable number of such groups and by which the arrangement is such that the disadvantages above referred to are eliminated. For this purpose there are placed or pressed directly against the diaphragm in the known manner, permeable, for example perforated electrode sheets, which are then arranged or pressed in frames and then the separate arrangements of this character are so arranged in parallel that an electrolyte chamber is limited on its two largest surfaces by gas generating electrodes. Only the electrolyte chambers at the two ends of an electrode group of this character are provided with a gas generating electrode which bears directly against a diaphragm.

It is also possible in these end chambers to produce a favourable electrolyte gas mixture by providing a second electrode which is spaced from the first electrode at a shorter distance than between two electrodes of normal electrolyte chambers. By this step gas is also generated on the second large surface even though to a reduced extent.

This step for obtaining a uniform gas electrolyte mixture may be completed according to the invention by the further step of the difference in the dimensions of the cross sectional area of the hydrogen and oxygen electrolyte chambers. The cross sectional areas of the oxygen electrolyte chambers are preferably smaller than those of the hydrogen electrolyte chambers, being preferably half the size as in this case only half the quantity of gas is generated.

A further step consists in the construction of the shape of the frames which with the two electrode sheets are adapted to enclose the electrolyte chamber. The electrolyte is supplied to the frames at the lowest point thereof and the electrolyte gas mixture is conducted away at the highest point thereof. In this connection it is preferable to gradually enlarge the inflow passage where it leads into the electrolyte chamber so that the electrolyte is supplied as uniformly as possible over the whole width of the chamber.

This attempt is restricted to certain limits in many decomposing devices, for example in pressure decomposing devices, by the shape of the frames themselves, which in such cases must as far as possible be made to conform with the cross section of the pressure vessel (for example circular cross section) and by the introduction of the second counterpole electrolyte passage. In these cases however, it is possible to cause the frame wall which limits the electrolyte chamber to rise gradually towards the supply passage so that the electrolyte flowing out of the enlarged passage may also pass laterally upwards and thus spray the entire chamber. The same step is also adopted for the outflow of the gas-electrolyte but to a greater extent.

In order to obtain a ready outflow of gas the upper limiting lines of the frame are considerably inclined, more considerably than the lower ones, as the quantity of gas-electrolyte to be conducted away from the top is greater than the quantity of electrolyte supplied at the bottom by the amount of gas which it conducts away so that at the top a higher velocity of flow is necessary.

As regards the purity of the gas it has been found to be preferable to arrange the ends of the supply and outflow passages into the electrolyte chambers practically at the vertical central axis of the frames.

It is to be observed that at the supply and outflow points the highest velocities of inflow and outflow occur. With the occurrence of variations of velocity there are combined variations of pressure which, though they do not occur to the same degree on both sides of the diaphragm, give rise to disturbances of the electrolyte through the diaphragm to the points at lower pressure.

The principles of construction above described produce particular advantages when applied to a decomposing device in a filter press arrangement.

The electrodes are preferably arranged vertically to the longitudinal axis of the electrolyzer in such a manner that two electrodes of the same potential together with the corresponding frame form a closed chamber provided at the bottom with a connection with the supply of the electrolyte and at the top with a connection for the outflow of the electrolyte. The electrodes may have the same outline as the frames but it is preferable to make them of smaller outline than the frame itself so that they can be pressed into a somewhat deepened groove in the frame. The current supply lugs of the electrodes then pass laterally from the frame through recesses which extend the grooves. Each frame with electrodes pressed into the two sides thereof and the current supply ribs forms a construction unit. The assemblage is effected by simply placing one above the other a number of such electrode units, a diaphragm being always placed between each pair of these units. This diaphragm may again have the same outline as the frames, or it is made with a smaller outline and is then also pressed into a groove of one of the frames or of both frames. In the first case the diaphragm is provided with stamped out passages to form parts of the gas and electrolyte conduits, whilst in the latter case these may be omitted. By pressing the diaphragm into the frames there is obtained a further simplification of the assemblage as it is now only necessary to place one above the other further frame units which are already provided with the electrodes and diaphragms.

The electrodes themselves may be permeable, for example perforated. They are relatively supported by rods or distance pieces of any suitable character in such a manner that the distance pieces are at the same points on the units which do not directly follow one another, whilst on the intermediate units they are provided at intermediate points so that on the assemblage of the electrodes a preliminary tensioning is obtained by which they are pressed against the diaphragm. As a whole there are thus provided two different securing points for the distance pieces which follow one another alternately. In this manner it is also possible for very thin electrodes to bear against the diaphragm as a result of which there is obtained a high efficiency, pure gases, and protection of the diaphragms against mechanical influences. If the electrodes are made so thin that a supply of current to the electrodes laterally or distributed over the whole periphery thereof is no longer possible, as the resistance would be too great by reason of the smaller cross section, the current is supplied by separate current supply means which are then placed between the electrodes. The distance pieces are then preferably secured directly to the current supply means which may be a plate whereas in the other case they are connected to one electrode alone or to both electrodes for example, by welding, preferably electric welding. The tensioning produced by the distance pieces must not be too strong, that is to say, there must only be produced a slight arching or curving of the electrodes as otherwise a collapsing of the diaphragm or the formation of hollow spaces from which the gas could only be withdrawn defectively or not at all, would be liable to occur.

The frames which hold together the constructional units above described are preferably constructed, particularly in the case of pressure decomposing devices, with partly circular, partly straight line outline. Each frame of such decomposing devices having groups of electrodes arranged in parallel, the groups being arranged in series, is provided with two main electrolyte passages and two electrolyte group passages and two electrolyte-gas main passages and two electrolyte-gas group passages which are preferably at the top and bottom arranged closely together at the middle so as to enable the electrolyte to be supplied at the lowest point and the gas withdrawn at the highest point.

In order to maintain the pressures on both sides of the diaphragm uniform it is necessary, disregarding a suitable circulation outside the cells, for the circulation through the cells to take place in such a manner that a pressure equalization as complete as possible is obtained everywhere. This is firstly obtained by the steps above described according to which the cross sectional area of each electrolyte chamber is selected according to the gas which is generated that is to say, the cross sectional area of the hydrogen chamber is larger than that of the oxygen chamber up to twice the size, that is to say the internal depth (thickness) of the hydrogen frames is twice the size the internal depth of the oxygen frames. Further it is preferable for this purpose also to have the above described arrangement of the inflows and outflows in the vertical central axis of the frames. This is particularly important for the outflow as in this case higher gas concentrations occur so that a displacement of the electrolyte gas mixture by reason of pressure balances through the diaphragm would be liable to lead to considerable impurities.

The tension spindles which are adapted to hold together such constructions are preferably placed into outwardly open enlargements of the frame periphery so that the spindles are only partly surrounded by the frame.

Between the spindles and frame there is provided a suitable spacing which is only bridged at separate points by insulating bodies which take up the weight of the cell body.

The spindles preferably do not press directly upon the closure plates but upon iron discs from which the spindle pressure is transmitted by insulation pieces to the closure plates of the cell body. This method has the great advantage that shunt circuits, which would be liable to pass through the spindles, can be almost entirely obviated.

The ribs projecting from the frames in the parallel series arrangement are secured to collecting bars, preferably copper bars. The ribs preferably extend laterally upwards or downwards or preferably only laterally from the frame. Preferably the ribs are so arranged that the two electrodes of one frame can be secured to the bars by common securing means, for example, bolts. These bars always connect hydrogen and oxygen electrodes of succeeding cell packets and are located alternately at one side and the other of the cell body.

Preferably these bars are mounted on a carrying body, for example iron bars or preferably half upon iron casings, by means of insulating intermediate pieces for example, porcelain bodies. The carrying body has substantially the same length as the whole cell body and is supported on the pressure vessel with or without insulation. This carrying body supports the weight of the cell body so that this, even when of great length, cannot bend and at the same time facilitates the insertion of the cell body into the pressure vessel.

This arrangement has the advantage that when the lye passes out of the cell body and moistens the insulating pieces, the current only passes from metal to metal without the assistance of the frame material so that this is not damaged in any way.

The carrying body may at the same time be so constructed that it can take over the pressing together of the cell body. The pressing together may also be effected by separate spindles which are then freely mounted and which are not supported by insulating bodies either on the cell body or on the pressure vessel.

In another construction of the tensioning and supporting construction particularly adapted for larger diameters, the cross sections of the cell bodies are simpler and more economical in shape and the passages instead of being rectangular are of oval cross section which is more favourable for productiton and operation.

Tensioning and carrying constructions are in this case entirely separate from one another. As a result of this arrangement the assembled cell body acquires a substantially circular cross section which is particularly advantageous for pressure decomposing devices, which are mounted in a pressure vessel, and requires less space.

Whilst on the one hand the described construction has the particular possibility of constructing and operating a unit for a decomposing device for any suitable voltage and current strength and it would also be possible to raise the voltage to high values a decomposing device with bi-polar arranged electrodes, in the case of high voltages, as for example 220, 440 or more volts, has considerable advantages, particularly by reason of the simplification of construction, if it is possible also in such cases to choke the shunt current which passes through the passages.

The known bi-polar decomposing devices have the disadvantage of a fairly considerable shunt current which arises by reason of the fact that the electrodes at the same time carry the passage walls whereby the current finds an opportunity of becoming noticeable in the passage from one passage wall to the adjacent one, which is only separated therefrom by a gap of the thickness of the diaphragm and also to passage walls located at a greater distance.

This disadvantage, according to the invention, is restricted to a minimum by forming the passage walls wholly or mainly of the insulating material of the frames, between which the electrodes are embedded. Even when the electrodes still form a part of the passage wall they now only form a very small part thereof.

It is therefore particularly of advantage to remove the electrodes entirely from the passage wall in that according to one form of construction of the invention they are pressed into the above described groove of the electrode frame.

An example of a decomposing device according to the invention wherein a number of electrodes are arranged in parallel and the groups thus formed are arranged in series, is shown in the accompanying drawings.

As will be seen from Figs. 1, 2, 3, 7 and 8, one electrode group consists of four hydrogen frames 1, each provided with two hydrogen electrodes 2, three oxygen frames 3 each provided with two oxygen electrodes 4, two narrower oxygen frames 5 each provided with an oxygen electrode 4 and an additional electrode 6, eight diaphragms 7 and a closure plate 8.

Figure 4:
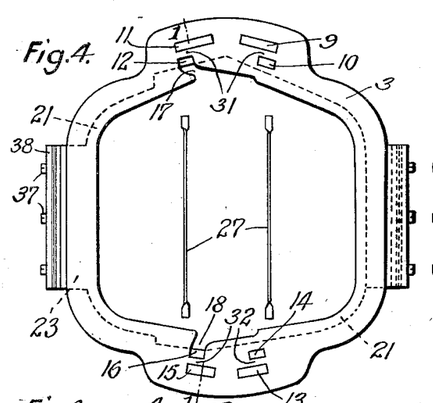
Fig. 4 shows a section transversely to the longitudinal axis of the decomposing device through an oxygen frame.

In Fig. 4 is shown an oxygen frame. At the top right hand corner there is provided the main hydrogen electrolyte collecting passage 9 and underneath this the group hydrogen electrolyte collecting passage 10 whilst to the left on the same level the main oxygen electrolyte collecting passage 11 and the group oxygen electrolyte collecting passage 12.

At the right hand side of the bottom there is shown the main electrolyte supply passage 13 and the group electrolyte supply passage 14 for the hydrogen generating chambers and on the same level at the left the main electrolyte supply passage 15 and the group supply passage 16 for the oxygen generating electrolyte collecting chambers.

In the oxygen frames the group passages 12 and 16 have considerably enlarged connecting openings 17 and 18 which lead to the middle of the frame.

Figure 5:
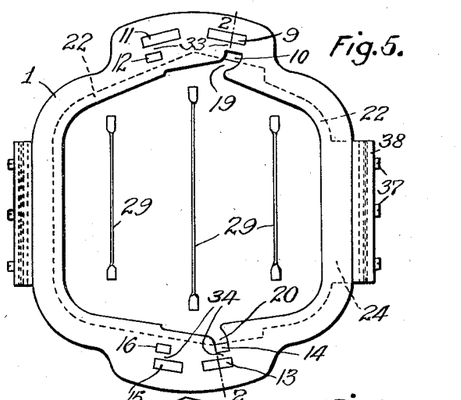
Fig. 5 shows a similar section through a hydrogen frame.

The group passages 10 and 14 of the hydrogen frames as shown in Fig. 5 have similar connecting openings 19 and 20 leading to the electrolyte chamber inside the frame. The hydrogen frames are of exactly the same construction as the oxygen frames. They are only turned through 180° about their vertical central axes whereby the connecting passages 12, 17 and 16, 18 are located on the hydrogen side.

The frame is further provided at both sides with a groove 21 or 22 corresponding with the outline of the electrodes 4 or 2 (see Fig. 6a, 6b) which grooves are laterally enlarged into a groove 23 or 24 extending over the whole width of the frame. The groove has a depth corresponding to the thickness of the electrodes or somewhat less so that the electrode, when placed or pressed into the groove, coincides evenly with the other surfaces of the frame. The current supply lugs 25 or 26 of the electrode are thus located in the grooves 23 or 24.

Figure 6:
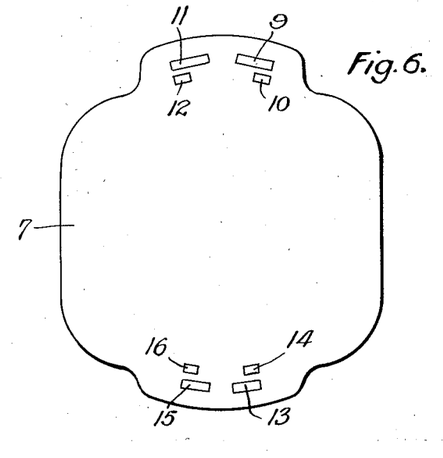
Fig. 6 shows a diaphragm.
Figure 6A:
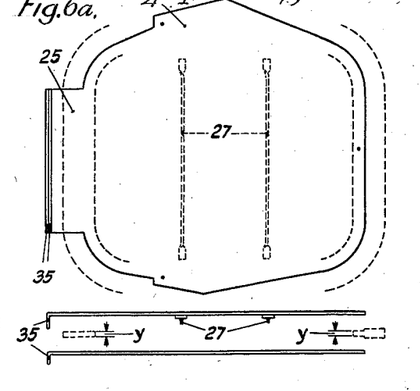
Fig. 6a shows an oxygen electrode.
Figure 6B:
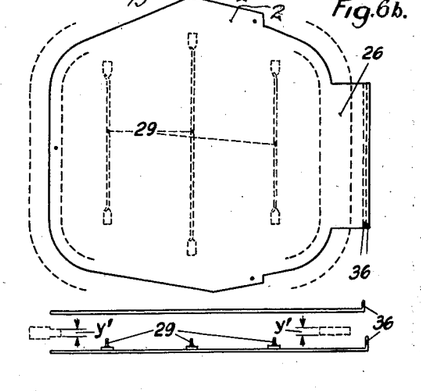
Fig. 6b shows a hydrogen electrode.
Figure 7:
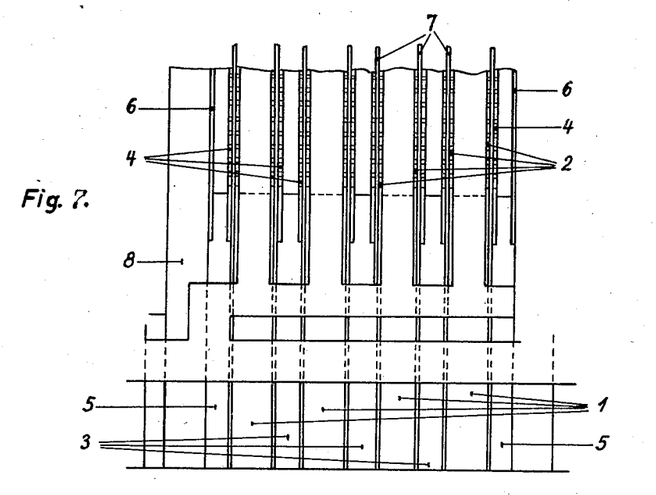
Fig. 7 shows a cell arrangement in vertical section.
Figure 8:
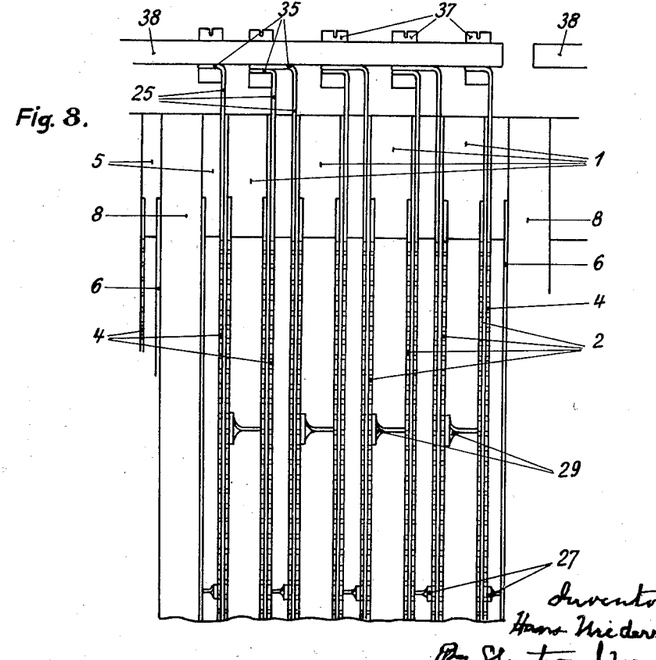
Fig. 8 shows the same cell arrangement in horizontal section to a larger scale.

The electrode may be provided at the three points indicated by dots in Figs. 6a, 6b with small welded or struck-up points, which when pressing the electrode into position penetrate into the frame and thus firmly hold the electrode and frame together.

The frames shown in Figures 4 and 5 have the grooves 23 and 24 on the same side as also the corresponding connecting openings 17, 18 or 19, 20 and half of all the oxygen and hydrogen frames are constructed in this manner. The other half of the oxygen and hydrogen frames however are provided with the groove 23 or 24 without otherwise modifying the form of construction on the other side. As will be seen in Figs. 6a and 6b, the current supply lugs 25 and 26 of the oxygen and hydrogen electrodes are alternately on opposite sides, that is to say, in one case on the right and in the other case on the left of the cell body whilst the corresponding electrolyte-gas passages are always on the same side that is to say, for example, the oxygen passages are on the left hand side and the hydrogen passages on the right hand side.

Each hydrogen frame 1, each oxygen frame 3 and also each reduced oxygen frame 5 is provided at both sides with electrodes 2, 4, and 4 and 6 which are secured to the frame, for example by pressing. These electrodes are therefore not only held and supported by the frame on the periphery but are also relatively supported on the freely exposed surfaces. This for example is effected by securing on the one half of the oxygen electrodes 4, two sheet metal strips 27 (Fig. 4) placed on edge and extending vertically to the electrode, for example by turning them at the ends through 90° and welding them electrically to the electrode. These sheet metal strips have a height which is equal to the thickness $y$ of the frame in the groups or it is preferably somewhat greater than this frame thickness thus for example, when this frame thickness $y$ in the case of the oxygen electrodes is 2 or 3 mm. the distance sheet metal strips 27 are made of a height of about 2.1 to 2.2 or 3.1 to 3.2 mm.

To one half of the hydrogen electrodes 2 are attached three sheet metal strips 29 (Fig. 5) in the position shown in Fig. 6b. Assuming that the hydrogen frame has a frame thickness $y'$ of 4 or 6 mm. in the groove, then these sheet metal strips have a height of 4.1 to 4.2 or 6.1 to 6.2 mm.

In the case of high pressure decomposing devices the reduction of the frame thickness $y$ based and obtained on the basis of the reduction of gas volume which occurs with increasing pressure, that is to say, the depth dimensions of the cross section, is known and has already been used.

The frame thickness $y$, that is to say, the depth dimension of the electrolyte chamber or cell cross sectional area may be reduced in low pressure decomposing devices and in high pressure decomposing devices, that is to say, made very small relatively to the height of the cells, by imparting a velocity which is higher than the normal velocity to the circulating electrolytes. This has the considerable advantage that the Joule heat of a larger circulated quantity of electrolyte can be withdrawn, that is to say that the electrolyte in this process need not be cooled to such an extent as in the ordinary process. The electrolyte therefore returns to the cells at a comparatively higher temperature thus increasing the efficiency.

It is therefore of particular advantage to use this accelerated circulation in pressure decomposing devices.

The length of all the sheet metal strips is made in accordance with the course of the lateral upper and lower limiting lines of the electrodes in such a manner that a certain sufficient distance from these limiting lines is maintained. These distance bars on assemblage press upon the electrode, the diaphragm and the other electrode located behind the diaphragm whereby the electrodes and the diaphragm acquire a slight arching as a result of which the electrodes bear firmly against the diaphragm. By reason of the mechanical protection of the diaphragm associated therewith a further advantage in the efficiency and purity of gas is obtained. The bars must not extend to the outer limiting lines as otherwise the arching would extend up to this point and would still either be transmitted to the frame itself which is undesirable or, when the frame is very resistant, would produce coarse and sharp bendings and fractures in the electrodes which would be extremely deleterious as regards the required uniform engagement.

The spacing of the end points of the strips must be so selected that a gradual and uniform transmission to the frame is obtained.

The desired tension may also be obtained in another advantageous manner in that, in the case of electrodes, which as a whole have a circular outline thus for example in the case of the electrodes shown, each fourth electrode is provided at the middle with a small pin which is also longer than the frame thickness $y$. If for example a hydrogen electrode 2 is provided with a pin of this character the two hydrogen electrodes are arched somewhat at the middle so that externally they have the appearance of truncated cones. As the succeeding diaphragms and oxygen electrodes are firmly pressed together at the periphery by the frame they are also arched and bear effectively at all points against the first mentioned electrodes.

Instead of a single pin at the middle there may also be preferably used a circle of small pins arranged closely around the centre. In this manner the outside conical point by which the diaphragm would be liable to be pierced, is avoided and the electrode, instead of acquiring a conical shape, acquires a parabolic or similar shape. Preferably a tensioning device of this character is provided on a hydrogen electrode as this can be made thicker than the oxygen electrode which consists of precious and therefore more expensive metals. In this manner there is obtained a gradual arching and the thin oxygen electrode therefore bears more effectively than would be the case when the thicker hydrogen electrode had to conform with the thinner oxygen electrode.

It has already been mentioned that the hydrogen frame 1 in the groove is preferably made twice as thick as the oxygen frame 3. The oxygen end frames 5, as they are only provided with an electrode bearing directly against the diaphragm, are made narrower than the oxygen frames 3 and they are made not half as thick but slightly thicker.

By pressing or otherwise securing two electrodes in or on one frame there are obtained constructional units which permit of a particularly easy and simple construction of the cell body.

In assembling, all that is necessary is to place the diaphragm between two of these frames.

In the present example of construction four constructional units for the hydrogen and five constructional units for the oxygen with the interposed eight diaphragms and a closure plate 8 form a group provided with four large passages 9, 13, 11, 15 and four small passages 10, 14, 12, 16.

The small passages in the first or last or first and last oxygen or hydrogen frame are connected by omission of the bars 31—32 or 33—34 (see Figs. 4 and 5) with corresponding large passages so that at the bottom the electrolyte can pass from the main supply passages into the group supply passages and from here into the separate electrolyte chambers whilst at the top the electrolyte mixed with the gas passes from the separate chambers into the group passages and from here, also by omitting these bars into the main collecting passages.

The connecting openings may further be provided wholly or partly in the closure plates 8.

The closure plates 8 are only provided with the four main passages 9, 13, 11, 15. These consist, in the same manner as the frames, of insulating material which is resistant to lye and gas. In the plates there are preferably provided one or more sheet metal insertions (not shown) extending over the entire cross section. These sheet metal insertions prevent the passage of shunt currents even when the insulating mass of the closure plates should be completely soaked with electrolyte for any reason. The outline of these sheet metal insertions is the same, slightly smaller or also slightly larger than that of the closure plates, and the passage recesses are somewhat larger than those of the closure plates so that the insulating mass encloses the insertion on all the surfaces of the passages.

The diaphragms 7 have the external shape of the frames shown in Fig. 6 and are provided with recesses for all the passages. The surface around the passages and the edges are impregnated coated or sprayed inwardly to the limit of the operative electrode surface with an insulating and non-attackable packing so as to prevent the electrolyte from being forced outwardly. They may also preferably be made smaller than the frames and embedded in these in which case the passages in the diaphragm may be omitted.

The frames 1, 3, 5 and the closure plates 8 may be cut, stamped, pressed or cast from any suitable insulating material. They are preferably produced from a suitable mixture by hot pressing or by pressing a suitable paste mixture into a mould and then by frequent subsequent pressing in machine or plunger presses and formed into the required shape, density and strength.

The hydrogen electrodes 2 preferably consist of iron and are permeable (fabrics, perforated sheets and so forth). Particularly suitable for this purpose are perforated plates. The electrodes are preferably stamped in one piece with the current supply lugs 25—35 or 26—36.

As oxygen electrodes there are preferably selected either nickelled iron electrodes of the same construction as the hydrogen electrode or there are preferably used perforated pure nickel sheets produced by rolling or galvanizing.

Diaphragms of different construction may be used, as for example, asbestos fabrics, asbestos pulp and the like. Diaphragms of asbestos pulp have been found to be the most suitable as in addition to their cheapness they also have the advantage of an extremely uniform distribution of fine pores which is of particular importance for pressure decomposing devices.

Figure 1:
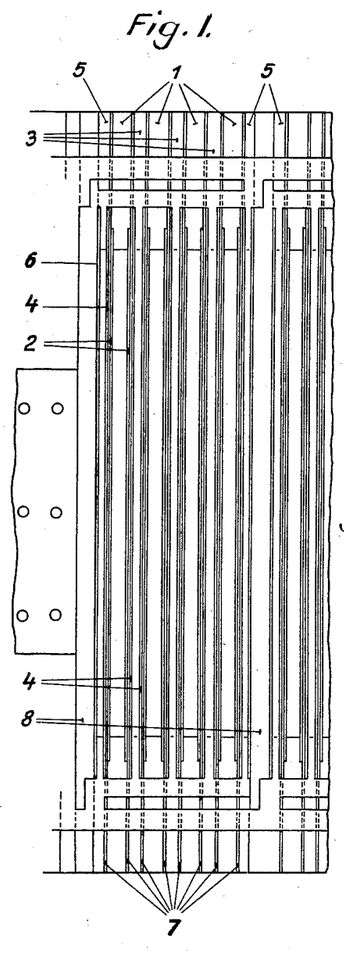
Fig. 1 shows a section through two electrode groups in series, substantially on the line 1—1 of Fig. 4 through the oxygen passages.
Figure 2:
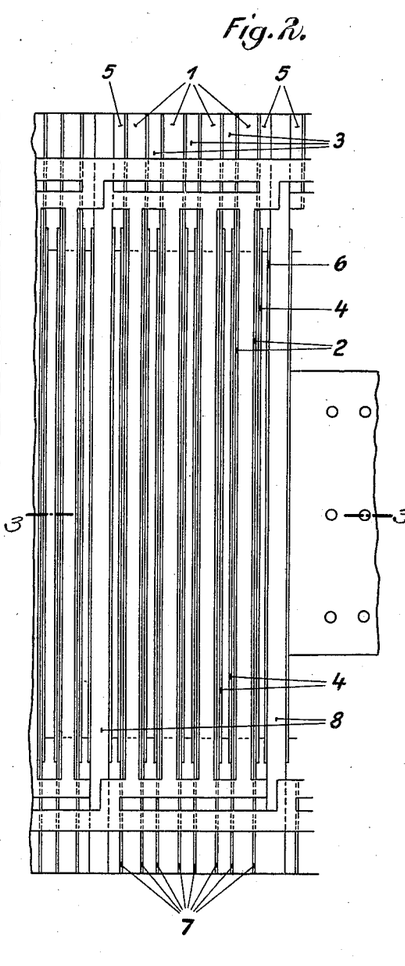
Fig. 2 is a similar section substantially on the line 2—2 of Fig. 5.
Figure 3:
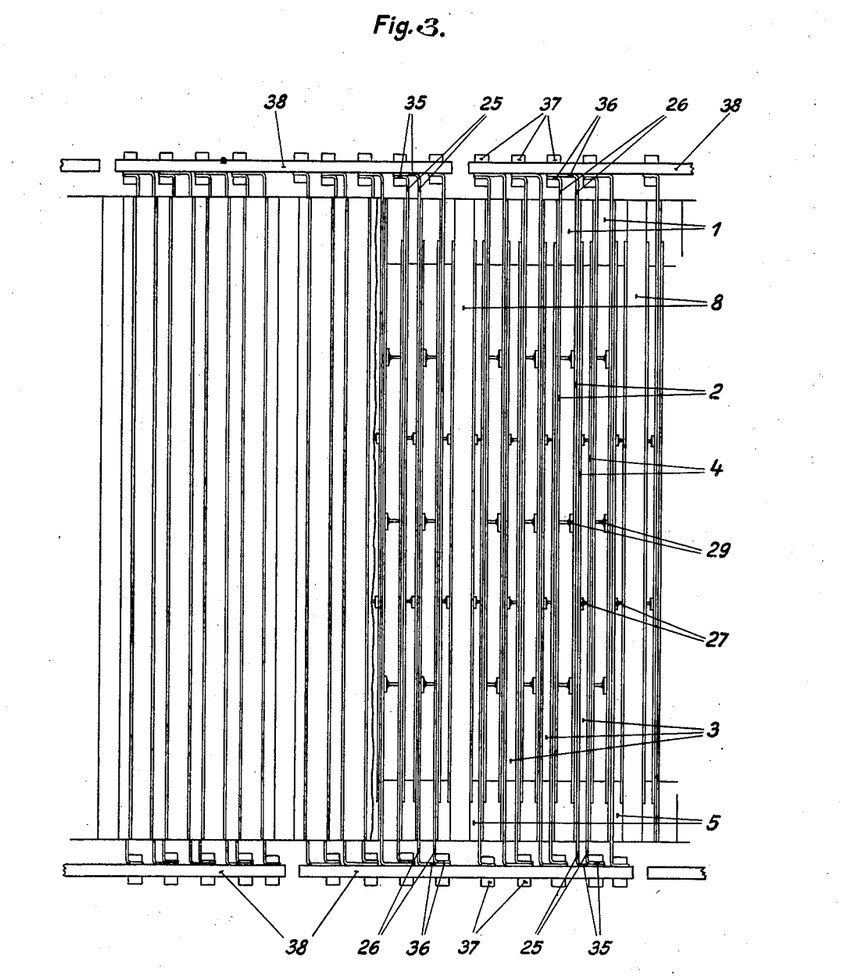
Fig. 3 shows the same electrode group partly in plan, and partly in a section on the line 3—3 of Fig. 2.

As above described the separate similar pole electrodes in one group are arranged in parallel whilst the separate groups are arranged in series. Fig. 3 shows this arrangement. The separate current supply lugs 25—35 or 26—36 are connected by bolts 37 or other securing means to the current conducting bands for example copper bars 38. One band connects two groups. The bands are arranged alternately on the left and right hand sides.

Figure 9:
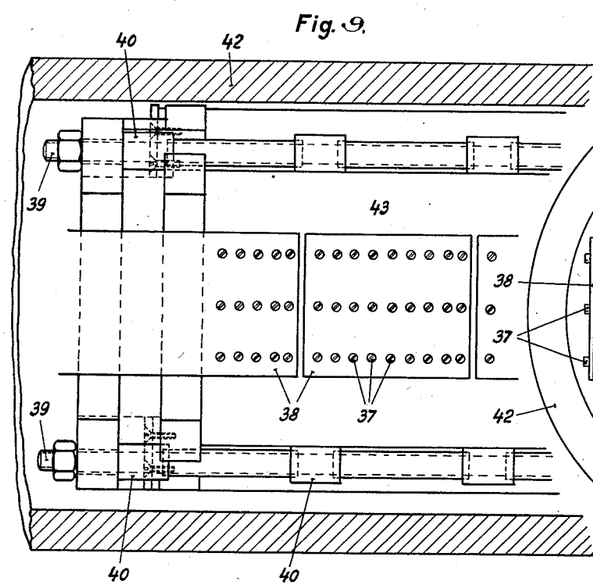
Figs. 9, 10, 11 show a cell body mounted in a pressure vessel.
Figure 10:
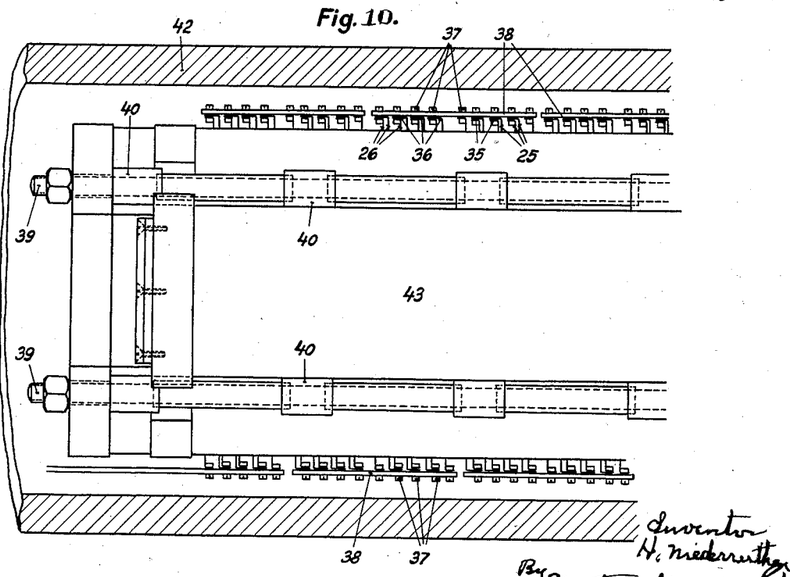
Figure 11:
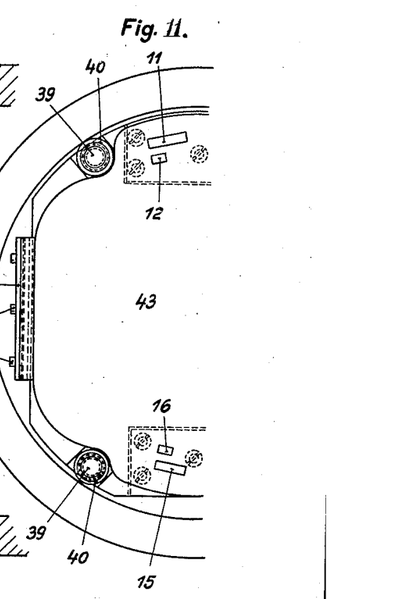

Figs. 9, 10 and 11 show a cell body mounted in a pressure vessel. In the outer curved portions of the frames are located the four tensioning spindles 39 on which are fitted at suitable intervals, insulating supporting sleeves for example of porcelain. The spindles are also provided with means which maintain the spacing between the separate porcelain sleeves. The spindles may be constructed of round steel or the like in one piece or are preferably composed of a number of relatively insulated round steel pieces or thin links or the like.

The lower supporting sleeves 40 are mounted on a support adapted to the shape of the vessel of current conducting or preferably non-conducting material, for example, a sheet with an insulating coating on which the cell body is placed outside the vessel by means of which it is then placed into this vessel.

Figure 13:
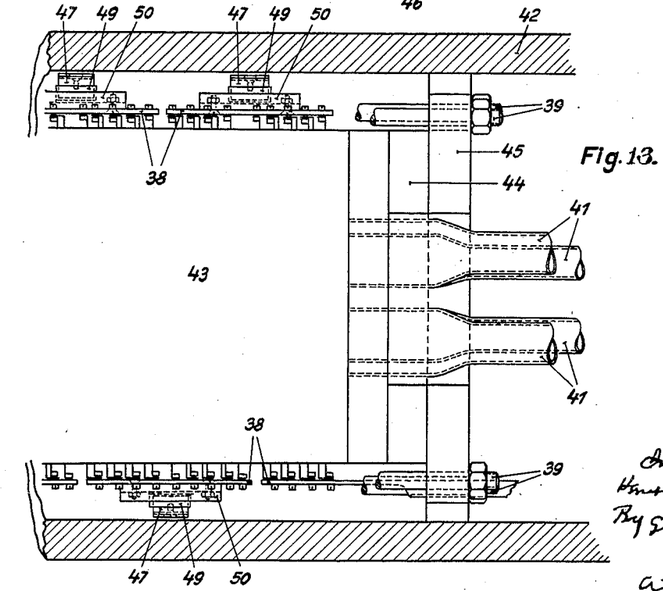

The four main passages 9, 13, 11, 15 pass at the end into the circular connecting pipes 41 (Fig. 13). These four pipes 41 are secured to the cover of the pressure vessel and packed for example by stuffing boxes.

At the sides are seen the current supply lugs 25—35 and 26—36, the copper bars 38, and the securing bolts 37.

The space between the pressure vessel 42 and the cell body 43 is filled with an insulating material.

Figures 12, 14:
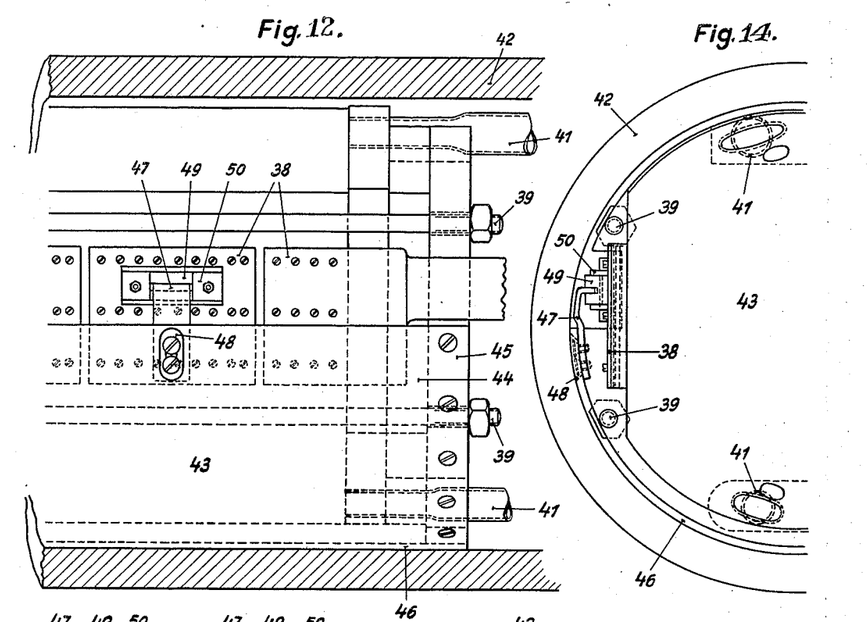
Figs. 12, 13, 14 show the tensioning and carrying construction for the cell body in side elevation, cross section and top plan.

In Figs. 12, 13 and 14 there is illustrated a tensioning and supporting construction for the cell bodies of a decomposing device of somewhat larger diameter ($d=220$).

The cross section of the cell body is simpler and more economical in shape, the passages instead of being rectangular are oval in shape which is more favourable for production and operation.

The construction of the current supply means remains unchanged.

The tensioning and supporting constructions are entirely separate.

The tensioning of the cell body is in this case effected, as previously, by four spindles 39 which now are located somewhat laterally and no longer come into contact with the cell body 43 but are connected to the outer press plates 45 which are supported from the remaining construction by an insulating layer 44.

The supporting construction consists of a half-open iron casing 46 which bears with very slight play against the wall of the pressure vessel. This casing is screwed at the beginning and end to the outer press plates 45, at the end in slots so that any variation in length can be provided for by pressing up the cell body.

On the supporting body 46 is supported the entire cell body 43 by the current bar members 38 of two groups through the medium of the supporting parts 47 which are movably bolted to the iron casing 46 in slots 48.

These supporting parts 47 engage with insulating bodies of porcelain 49 which are U-shaped in cross section and are held by the supporting members 50. The supporting members 50 in turn are bolted to the current bar members 38.

By these supporting constructions the cell body is secured against movement in every direction.

The iron casing 46 need not be made particularly thick even in long decomposing devices as it is supported along its whole length by the pressure vessel itself and is stiff by reason of its shape alone.

I claim:—

1. Electrolytic decomposing device comprising a plurality of juxtaposed frames having central aligned apertures, diaphragms closing the apertures at the junction of adjacent frames and providing individual cells, pairs of electrode sheets disposed in each cell, the electrode sheets of intermediate cells being perforated and located against the diaphragms, conductor means leading to the positive and negative poles of a source of current supply and joined to the electrodes of said cells so that both electrode sheets in a said cell are charged with the same polarity and the electrodes of adjacent cells are connected alternately to the positive and negative poles, and inlet and outlet conduit means for said cells.

2. A decomposing device as in claim 1 for the production of hydrogen and oxygen, in which the frames are alternately thick and thin for providing cells of corresponding thickness, the cells whose electrodes are electrically connected for generating oxygen being thinner than the cells connected for generating hydrogen.

3. A decomposing device as in claim 1, in which the frames have further apertures which are in aligned communication when the frames are juxtaposed and provide conduits constituting portions of said conduit means.

4. A decomposing device as in claim 1, in which the frames have pairs of apertures at the top and bottom which are in aligned communication when the frames are juxtaposed and provide four conduits constituting portions of said conduit means, one conduit at the top and the corresponding conduit at the bottom being in communication with the central aperture in each alternate frame.

5. A decomposing device as in claim 1, in which the frames have further apertures which are in aligned communication when the frames are juxtaposed and provide conduits constituting portions of said conduit means, said conduits being located at sides of a central vertical plane through the device, said frames having selective communication orifices from said conduits to the electrolyte spaces within the frames, said orifices having mouths opening to said spaces at said plane.

6. A decomposing device as in claim 1, in which the frames have further apertures which are in aligned communication when the frames are juxtaposed and provide conduits constituting portions of said conduit means, said frames having selective communication orifices from said conduits to the electrolyte spaces within the frames, said orifices having widened mouths opening to said spaces.

7. Electrolytic decomposing device comprising a plurality of juxtaposed frames having central aligned apertures, diaphragms closing the apertures at the junction of adjacent frames and providing individual cells, pairs of electrode sheets disposed in each cell, the electrode sheets of intermediate cells being perforated and located against the diaphragms, group positive and negative conductor means joined selectively to the sheets so that both electrodes in each said cell of a group are charged to like polarity and the electrodes of each two adjacent cells are alternately connected to positive and negative conductor means, the conductor means for the positive electrodes in one group being connected to the conductor means for the negative electrodes of one adjacent group, and the negative conductor means for said one group being joined to the positive group conductor means for the other adjacent group, so that electrodes in each group are supplied in multiple and the several groups are connected in series.

8. A decomposing device as in claim 7, in which the frames have further apertures which are in aligned communication when the frames are juxtaposed and provide conduits constituting portions of said conduit means, said conduits including common inlet and outlet conduits for all the frames, and also group inlet and outlet conduits, the frames having selective communication orifices from the group inlet and outlet conduits to the electrolyte spaces within the frames.

9. A decomposing device as in claim 7, in which the frames have further apertures which are in aligned communication when the frames are juxtaposed and provide eight conduits constituting portions of said conduit means, said conduits including four common inlet and outlet conduits for all said frames, and also four group inlet and outlet conduits, the frames having selective communication orifices from the group inlet and outlet conduits to the electrolyte spaces within the frames.

10. High pressure electrolytic decomposing device comprising a plurality of juxtaposed frames having central aligned apertures, diaphragms closing the apertures at the junctions of adjacent frames and providing individual cells, pairs of electrode sheets disposed in each cell, the electrode sheets of intermediate cells being perforated and located against the diaphragms, conductor means leading to the positive and negative poles of a source of current supply and joined to the electrodes of said cells so that both electrodes in a said cell are connected with the same conductor means and the electrodes of alternate cells are connected to opposite poles, inlet and outlet conduit means for said cells, and means for maintaining the electrolyte under pressure during operation in said frames.

11. Electrolytic decomposing device comprising a plurality of cell members, each composed of a frame having a central aperture and a pair of perforated electrode sheets closing said aperture and providing the cell cavity, said cell members being juxtaposed with electrodes adjacent one another, diaphragms inserted between the adjacent electrode sheets of each pair of cells, conductor means for connecting both sheets of each alternate cell member to the positive pole of a source of current supply and both sheets of the other cell members to the negative pole thereof, and inlet and outlet means for supplying and removing electrolyte and gas to and from said cells.

12. An electrolytic decomposing device as in claim 11, including spacing members located between the pairs of electrode sheets in a cell member for supporting the surfaces thereof with respect to one another within the space provided by the central aperture.

13. An electrolytic decomposing device as in claim 11, including spacing members located between the pairs of electrode sheets in a cell member for supporting the surfaces thereof with respect to one another, said spacing members being connected to the electrode sheets and staggered with respect to one another on the two sheets of a pair.

14. A decomposing device as in claim 11, in which the electrode sheets are thin and reinforcing ribs are provided thereon and extend through the electrolyte space and to the exterior for providing a part of said conductor means.

15. Electrolytic decomposing device comprising a plurality of cell members each composed of a frame having a central aperture and grooves adjacent said aperture and a pair of perforated electrode sheets closing said aperture and resting in said grooves and providing a cell cavity, said cell members being juxtaposed with the electrodes adjacent one another, diaphragms inserted between the adjacent electrode sheets of each pair of cells, conductor means for connecting both sheets of each alternate cell to the positive pole of a source of current supply and both sheets of the other cells to the negative pole thereof, and inlet and outlet means for supplying and removing electrolyte and gas to and from said cells.

16. A decomposing device as in claim 15, in which the grooves at the two faces of the frame have each an enlargement, the two enlargements being at the same side of a frame, and the pair of electrode sheets for said frame have current conducting lugs located in said enlargements.

17. A decomposing device as in claim 15, in which the grooves at the two faces of the frame have each an enlargement, the two enlargements being at the same side of a frame, and the pair of electrode sheets for said frame have current conducting lugs located in said enlargements, the lugs for the electrode sheets of alternate cells extending toward opposite sides of the juxtaposed frames, and conductive members connecting groups of the lugs of the electrode sheets projecting at the same sides of the group of frames.

18. An electrolytic decomposing device comprising a plurality of cell members each composed of a frame having a central aperture and a pair of perforated electrode sheets closing said aperture and providing a cell cavity, said cell members being juxtaposed with the electrodes adjacent one another, diaphragms inserted between the adjacent electrode sheets of each pair of cell members, conductor means for connecting both electrode sheets of each alternate cell member to the positive pole of a source of current supply and both electrode sheets of the other cell members to the negative pole thereof, inlet and outlet means for supplying and removing electrolyte and gas to and from said cell members and means including tension bars located externally of the frames for holding said frames in juxtaposed position.

19. Electrolytic decomposing device comprising a plurality of cell members each composed of a frame having outwardly open depressions in its periphery and a central aperture and a pair of perforated electrode sheets closing said aperture and providing a cell cavity, said cell members being juxtaposed with the electrodes adjacent one another, diaphragms inserted between the adjacent electrode sheets of each pair of cell members, conductor means for connecting both electrode sheets of each alternate cell member to the positive pole of a source of current supply and both electrode sheets of the other cell members to the negative pole thereof, inlet and outlet means for supplying and removing electrolyte and gas to and from said cell members, and means including tension bars located in said depressions for holding the frames in juxtaposed position.

20. Electrolytic decomposing device comprising a plurality of cell members each composed of a frame having a central aperture and a pair of perforated electrode sheets closing said aperture and providing a cell cavity, said cell members being juxtaposed with the electrodes adjacent one another, diaphragms inserted between the adjacent electrode sheets of each pair of cell members, conductor means for connecting both sheets of each alternate cell member to the positive pole of a source of current supply and both sheets of the other cell members to the negative pole thereof, inlet and outlet means for supplying and removing electrolyte and gas to and from said cell members, and supporting means including insulated portions engaged with said conductor means for supporting the juxtaposed cell members at a plurality of individual points.

21. Electrolytic decomposing device comprising a plurality of cell members each composed of a frame having a central aperture and a pair of perforated electrode sheets closing said aperture and providing a cell cavity, said cell members being juxtaposed with the electrodes adjacent one another, diaphragms inserted between the adjacent electrode sheets of each pair of cell members, conductor means for connecting both sheets of each alternate cell member to the positive pole of a source of current supply and both sheets of the other cell members to the negative pole thereof, each frame providing also a lower electrolyte inlet passage and an upper electrolyte outlet passage, and inlet and outlet means for supplying and removing electrolyte and gas to and from said passages.

22. An electrolytic decomposing device comprising a plurality of cell members each composed of a frame having a central aperture and a pair of perforated electrode sheets closing said apertures and rigidly joined to said frame and providing therewith a cell cavity, said cell members being juxtaposed with the electrodes adjacent one another, diaphragms inserted between the adjacent electrode sheets of each pair of cell members, conductor means for connecting both sheets of each alternate cell member to the positive pole of a source of current supply and both sheets of the other cell members to the negative pole thereof, and inlet and outlet means for supplying and removing electrolyte and gas to and from said cell members.

23. Electrolytic decomposing device comprising a plurality of cell members each composed of a frame having a central aperture and a pair of perforated electrode sheets closing said aperture and providing the cell cavity, said cell members being juxtaposed with the electrodes adjacent one another, sheets of asbestos paper forming diaphragms and inserted between the adjacent electrode sheets of each pair of cell members, conductor means for connecting both electrode sheets of each alternate cell member to the positive pole of a source of current supply and both electrode sheets of the other cell members to the negative pole thereof, and inlet and outlet means for supplying and removing electrolyte and gas to and from said cell members.

HANS NEIDERREITHER.